Patented Dec. 8, 1953

2,662,089

UNITED STATES PATENT OFFICE 2,662,089

14 ALPHA-HYDROXY-ANDROSTENE-DIONES AND PROCESS

Herbert C. Murray, Hickory Corners, and Durey H. Peterson, Kalamazoo, Mich., assignors to The Upjohn Company, Kalamazoo, Mich., a corporation of Michigan No Drawing. Application August 28, 1952, Serial No. 306,921

3 Claims. (Cl. 260—397.4)

This invention relates to steroids and more particularly to 14α-hydroxy-4-androstene-3,17-dione and 14α-hydroxy-10-normethyl-4-androstene-3,17-dione.

The novel compounds of the present invention may be prepared by subjecting testosterone or 10-normethyltestosterone to the oxygenating action of a culture of fungus of the order Mucorales as described in the applications of which this is a continuation-in-part, Serial No. 180,496, filed August 19, 1950, now abandoned and Serial No. 272,944, filed February 23, 1952, now Patent 2,602,769, issued July 8, 1952, Serial No. 296,731, filed July 1, 1952, now abandoned and Serial No. 297,242, filed July 5, 1952, and oxidizing the thus-produced 14α - hydroxytestosterone or 14α - hydroxy-10-normethyltestosterone. An alternative process for preparing 14α-hydroxy-4-androstene-3,17-dione is illustrated by Example 2.

It is an object of this invention to provide the novel 14α-hydroxy-4-androstene-3,17-dione and the novel 14α - hydroxy-10-normethyl-4-androstene-3,17-dione, otherwise identified as 14α-hydroxy-4-estrene-3,17-dione. Other objects will be apparent to those skilled in the art to which this invention pertains.

The novel compounds of the present invention are represented by the following formula:

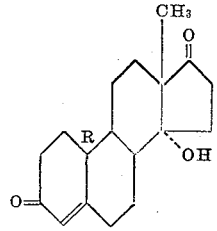

wherein R is hydrogen or methyl.

The following examples are illustrative of processes for the production of the products of the present invention, but are not to be construed as limiting.

PREPARATION 1.—14α-HYDROXYTESTOSTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with Mucor griseo cyanus, American Type Culture Collection Number 1207a(+), and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Mucor griseo cyanus was added 1.5 grams of testosterone in thirty milliliters of absolute ethanol to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The semicrystalline extractives obtained upon evaporation of the methylene chloride solvent weighed 6.73 grams.

Partial decolorization of the crude extractives was effected by taking them up with 35 milliliters of methylene chloride, adding three grams of Magnesol synthetic magnesium silicate and filtering. Upon evaporation of the solvent, the residue was taken up in an excess of acetone, mixed with 0.2 gram of Celite No. 545 diatomaceous earth, filtered, and evaporated to dryness. This residue was dissolved in 100 milliliters of benzene and fractioned over 340 grams of alumina (washed with hydrochloric acid and dried at 120 degrees centigrade) with 325 milliliter portions of solvent fractions as in the table.

Fraction 22 shown in the table, was triturated with one milliliter of acetone and three milliliters of ether, and filtered. The resulting crystalline residue was combined with fractions 17 to 21 and recrystallized from ten milliliters of acetone by additions of ether. Recrystallization gave 1.577 grams of crude 14α-hydroxytestosterone, melting at 184 to 186 degrees centigrade. Recrystallization twice more gave 14α-hydroxytestosterone having a melting point of 185 to 187 degrees centigrade and an optical rotation $[\alpha]_D^{23}$ of plus 124 degrees (0.974 in chloroform). Infrared spectrum showed the presence of an additional hydroxyl on testosterone.

Analysis: Calculated for $C_{19}H_{28}O_3$: C, 74.96; H, 9.27. Found: C, 74.69; H, 9.27.

TABLE

| Fraction | Solvent | Eluate Solids, Milligrams |
|---|---|---|
| 1 | benzene | 138.0 |
| 2 | do | 89.5 |
| 3 | benzene plus 50 percent ether | 223.5 |
| 4 | ether | 27.5 |
| 5 | do | 13.5 |
| 6 | ether plus 5 percent chloroform | 10.5 |
| 7 | do | 9.5 |
| 8 | ether plus 10 percent chloroform | 11.5 |
| 9 | do | 20.5 |
| 10 | ether plus 20 percent chloroform | 38.0 |
| 11 | do | 40.5 |
| 12 | ether plus 50 percent chloroform | 216.0 |
| 13 | do | 942.5 |
| 14 | chloroform | 545.0 |
| 15 | do | 149.5 |
| 16 | chloroform plus 5 percent acetone | 213.0 |
| 17 | do | 293.0 |
| 18 | chloroform plus 10 percent acetone | 309.0 |
| 19 | do | 236.0 |
| 20 | chloroform plus 20 percent acetone | 508.5 |
| 21 | do | 320.0 |
| 22 | chloroform plus 50 percent acetone | 1,120.0 |
| 23 | do | 306.5 |
| 24 | acetone | 97.5 |
| 25 | do | 145.0 |
| 26 | acetone plus 5 percent methanol | 163.5 |
| 27 | acetone plus 10 percent methanol | 134.5 |
| 28 | do | 65.5 |
| 29 | methanol | 115.0 |
|  |  | 6,592.5 |

PREPARATION 2.—14α-HYDROXY-10-NORMETHYL-TESTOSTERONE

In the same manner as described in Preparation 1, 14α-hydroxy-10-normethyltestosterone is prepared from 10-normethyltestosterone, [Birch, J. Chem. Soc., (London) 1950, 367] by subjecting the latter steroid to the oxygenating activity of Mucor griseo cyanus, American Type Culture Collection Number 1207a(+). The resulting oxygenated steroid is isolated from the fermentation mixture in the same manner as described in Preparation 1 and purified 14-hydroxy-10-normethyltestosterone is obtained by crystallization of the reaction product from ethyl acetate.

*Example 1. — 14α-hydroxy-4-androstene-3,17-dione*

14α-hydroxytestosterone (510 milligrams) was dissolved in eight milliliters of glacial acetic acid. To this chilled solution 130 milligrams of chromium trioxide dissolved in 0.5 milliliter of water and five milliliters of glacial acetic acid was added dropwise. After eight hours the reaction mixture was diluted with ten milliliters of methanol and concentrated in vacuum. The residue was taken up in fifty milliliters of water followed by 100 milliliters of ether. A crystalline precipitate was formed in the organic phase which was filtered off to give ninety milligrams of crystals with a melting point of 260 to 262 degrees centigrade. After this filtration thirty milliliters of chloroform was added to the ether. The organic phase was washed three times with a twenty milliliter solution of five percent sodium carbonate and twice with twenty milliliters of water. On evaporation the dried extract gave 410 milligrams of a crystalline residue with a melting point of 258 to 262 degrees centigrade. After one recrystallization from ten milliliters of methanol the compound melted at 262 to 265 degrees centigrade. Infrared spectrum analysis showed this compound to be 14α-hydroxy-4-androstene-3,17-dione.

*Example 2.—14α - hydroxy - 4 - androstene-3,17-dione*

To 129.5 milligrams of 4-pregnene-14α,17α,21-triol-3,20-dione, which can be prepared as disclosed in U. S. Patent 2,602,769, dissolved in ten milliliters of glacial acetic acid there was added dropwise a solution of 103.5 milligrams of chromic trioxide in one milliliter of water and five milliliters of acetic acid. After twenty hours at room temperature, the reaction mixture was diluted with 25 milliliters of methanol, concentrated in vacuo to remove the excess methanol, diluted with seventy milliliters of water and extracted with three portions, fifty milliliters each, of five parts of ether and one part of methylene dichloride.

The combined extract was washed with fifteen-milliliter portions; once with water, twice with five percent sodium hydroxide, and four times more with water. The washed extract was dried over anhydrous sodium sulfate, filtered, and evaporated to give 71.7 milligrams of crystals which were recrystallized from two milliliters of acetone by adding hexane to the boiling solution to induce crystallization of the thus-produced 14α - hydroxy - 4 - androstene - 3,17 - dione, melting point 259 to 265 degrees centigrade, $[\alpha]_D^{23}$ of plus 171 degrees (0.660 in chloroform). Structure was confirmed by infrared spectrum.

Analysis: Calculated for $C_{19}H_{26}O_3$: C, 75.46; H, 8.66. Found: C, 75.21; H, 8.64.

*Example 3.—14α - hydroxy - 10 - normethyl-4-androstene-3,17-dione*

In the same manner as described in Example 1, 14α - hydroxy - 10 - normethyl - 4 - androstene-3,17-dione is prepared from 14α-hydroxy-10-normethyltestosterone by oxidizing the latter steroid with chromium trioxide. The resulting ketosteroid is isolated and purified by crystallization in accordance with Example 1.

The 14α - hydroxy - 4 - androstene - 3,17-dione and 14α - hydroxy - 10 - normethyl - 4 - androstene-3,17-dione of this invention have pharmacological activity per se, and are useful as chemical intermediates for the production of cardiac active hormones and other steroids which possess pharmacological activity. They demonstrate gonatrophic and folliculloid activities.

The oxygenated steroids of this invention possess lyophobic and an increased proportion of lyophilic groups causing them to be valuable interfacial tension modifying agents useful as emulsifying agents, emulsion breakers, suspending agents, and emulsion stabilizing agents. They may be used to prepare absorption bases having improved water absorption and emollient characteristics of utility in pharmacy and cosmetology alone or as carriers for known medicaments. A suitable absorption base preparation may be made by melting together a mixture of 85 percent white petrolatum, ten percent stearyl alcohol, and five percent oxygenated steroid, for example, 14α - hydroxy - 4 - androstene - 3,17-dione, and cooling the mixture while stirring until it congeals. The resulting absorption base may be readily triturated with aqueous material, at room temperature, or emulsified at elevated temperature, to form a smooth and stable water-in-oil emulsion.

The 14α - hydroxy - 4 - androstene - 3,17-dione of this invention can be reduced with sodium borohydride and acetylated to produce the known 5 - androstene - 3β,14α - diol - 17 - one-3-acetate.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 14α - hydroxy - 4 - androstene - 3,17-dione and 14α - hydroxy - 10 - normethyl - 4-androstene-3,17-dione.

2. 14α-hydroxy-4-androstene-3,17-dione.

3. 14α - hydroxy - 10 - normethyl - 4 - androstene-3,17-dione.

HERBERT C. MURRAY.
DUREY H. PETERSON.

No references cited.